Dec. 12, 1933.  F. C. PICKARD  1,939,080

METHOD OF MAKING CONVEYER SCREWS

Original Filed Dec. 3, 1928

INVENTOR.
Frank C. Pickard
BY
C. Archer Turner
ATTORNEY.

Patented Dec. 12, 1933

1,939,080

UNITED STATES PATENT OFFICE 1,939,080

METHOD OF MAKING CONVEYER SCREWS

Frank C. Pickard, Erie, Pa., assignor to The Standard Stoker Company, Incorporated, a corporation of Delaware Original application December 3, 1928, Serial No. 323,251. Divided and this application September 22, 1931. Serial No. 564,302

7 Claims. (Cl. 29—148)

This invention relates to conveyer screws having the general form of helical flights or threads and more particularly it appertains to and has for its principal object the provision of an improved method of making such conveyer screws for stokers conveying fuel, as coal to a furnace.

The present application is a division of my application Serial No. 323,251, filed December 3, 1928.

In practice such conveyer screws of the character referred to, and especially those used in stoker apparatus are ordinarily made of a tough, strong material to withstand the torsional driving force, as well as the sudden shocks or severe strains which occur when fuel blocks or jams in any way. At the same time, the helical or spiral flight or thread engaging and advancing the fuel is subjected to severe abrasion, particularly so at its peripheral or rim portion, which portion also being of tough and consequently somewhat soft material wears rapidly, reducing the effective conveyance of the material and necessitating frequent repair or replacement of the screw. It follows that such frequent repair and replacement is not only costly but also places the conveying apparatus out of service with resulting delays in the operation of the apparatus or of the work being done.

Use of the present invention will lengthen the useful life and reduce the expense of maintaining such screws in service.

Figure 1:
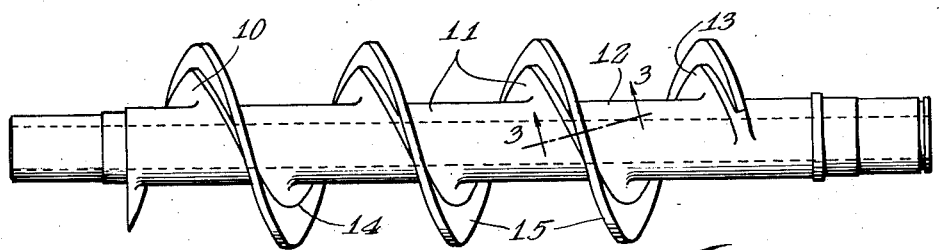
Figure 1 is a side elevation of the complete conveyer screw.

In the drawing is shown a conveyer screw as a whole at 10, which is of the usual helicoid form but in this invention it is considered important that it be formed, preferably of two members, although, as will be hereafter explained, it may be made up of more than two parts and be within the essence of this invention.

The screw 10 comprises as one of its members a hub portion 11 which includes a hub, core or shaft 12 and the stub flights or threads 13, as shown being formed integral with the hub or shaft 12. This hub member in the practice of this invention is made of a cast metal, preferably, though not necessarily, cast steel of a composition which can be annealed or heat treated to provide a member of soft, tough and strong material, such as will withstand the driving torque incident to its use. On the peripheral or rim portion of the stub flights or threads there is disposed a seat 14 which receives a spiral metal strip or ribbon 15 to form the complete screw.

As the conveyer screw moves the fuel normally in one direction only, the seat 14 is disposed at the periphery of the stub flights or threads on the impelling face thereof, the upright backwall of the seat, as cut in the flight, providing a support for the ribbon against any tendency of the fuel or any obstruction in the conveyer to cause a deflection of the spiral ribbon or of any portion thereof. It is, of course, obvious that the seat 14 may be located centrally of the flights or threads 13 on their rim portion and still be within the broader scope of this invention. However, its location on the impelling face of the flight is the more desirable because the ribbon portion is then the only part of the conveyer screw which is subjected to the wearing action of the material being conveyed. This seat may be cast with or machined in the screw.

Figure 2:
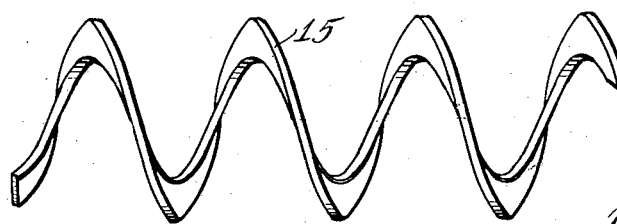
Figure 2 is a side elevation of the renewable spiral ribbon which forms the peripheral portion of the screw when assembled.
Figure 3:
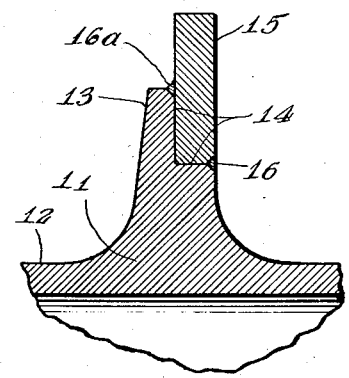
Figure 3 is a section on the line 3—3 of Figure 1 taken at a right angle with the screw flight.

The spiral strip or ribbon 15 as best shown in Figure 2, is constructed in the form of a spiral thread of one or more turns or of any desired number, dependent upon the length of the screw to which it is to be applied. This ribbon is made of abrasive-resisting malleable material, preferably, of an alloy steel having a carbon content sufficient to permit a high degree of hardening of the ribbon. Other metals or other materials which will submit to being spirally formed and that resist frictional wear equally with or preferably greater than the material of the hub member of the screw may be used. Any process or method of forming the spiral ribbon or its equivalent by making it up of a number of shorter spiral strips may be used, but is not a part of the present invention.

In carrying out the invention the complete screw is formed by mounting the ribbon 15 on one end of the hub member 11 and threading it in the seat 14 of the stub flights or threads 13 to its proper position thereon, the ribbon being securely held in its position by fastening means, such as welding it to the hub member along the edges of the seat 14 as indicated by the numerals 16, 16a, either at intervals or by a continuous weld. The edges of the seat and the adjacent edge of the ribbon are chamfered to provide a surface for obtaining a secure weld.

From the foregoing it will be apparent that this invention provides a conveyer screw formed by a hub portion so made as to withstand severe load stresses or sudden shocks and by a peripheral or rim portion of a separate, harder and abrasive-resisting material, thus presenting a hardened surface at that portion of the screw which is subjected to the greater frictional wear. It will also be observed that the invention lengthens the useful life of such screws and provides for the renewal of that portion of the screw which wears away without having to destroy the entire screw, thus the screw is manufactured and maintained at a minimum of cost.

While the preferred embodiment of the invention is illustrated and described, its use is such that variations may be resorted to and be within the scope and principle of the invention.

I claim:

1. The method of making conveyer screws which consists in casting a hub with stub flights thereon, forming a seat in the peripheral or rim portion of said stub flights on the normal impelling face thereof, chamfering the peripheral edges of the stub flights defining the outer extremities of the seat, then threading on said flights a hardened metal continuous multiple flight ribbon having higher abrasive resisting qualities than the cast metal hub stub flights and then welding said ribbon to stub flights along said chamfered edges.

2. The method of making conveyer screws which consists in casting a hub with stub flights thereon, forming a seat in the peripheral or rim portion of said stub flights on the normal impelling face thereof, chamfering the peripheral edges of the stub flights defining the outer extremities of the seat, coiling a metal strip having higher abrasive resisting qualities than the cast hub and flights to provide a continuous multiple flight ribbon of the required pitch and formed to fit the stub flights, threading said ribbon upon said stub flights in the seat thereof and then welding the ribbon to the stub flights along said chamfered edges.

3. The method of making conveyer screws which consists in casting a hub with stub flights thereon, machining a seat in the peripheral or rim portion of said stub flights on the normal impelling face thereof, chamfering the peripheral edges of the stub flights defining the outer extremities of the seat, then threading a continuous multiple flight spiral ribbon of malleable metal having higher abrasive resisting qualities than the cast hub and flights upon said stub flights in the seat thereof, and then securing said spiral ribbon in said seat by welding along said chamfered edges.

4. The method of making conveyer screws which consists in casting a hub with stub flights thereon, forming a seat in the peripheral or rim portion of said stub flights on the normal impelling face thereof, chamfering the peripheral edges of the stub flights defining the outer extremities of the seat, threading a continuous multiple flight spiral ribbon in said seat and then welding said ribbon to said stub flights along said chamfered edges.

5. The method of making conveyer screws which consists in casting the hub with stub flights thereon, forming an angular seat in the peripheral or rim portion of said stub flight on the normal impelling face thereof, then mounting one end of a continuous multiple flight spiral ribbon on one end of said stub flights and threading said ribbon on such flights in the seat thereof and then welding said ribbon to said stub flights.

6. The method of producing a conveyer screw which comprises forming a seat in the peripheral or rim portion of a stub flight on the normal impelling face thereof, then mounting one end of a continuous multiple flight spiral ribbon on one end of said stub flight and threading said ribbon on such flight in the seat thereof and finally welding said ribbon in place in said seat.

7. The method of producing a conveyer screw which comprises providing a stub flight, having a seat in its peripheral or rim portion on the normal impelling face thereof, on the hub of said conveyer screw, chamfering the peripheral edges of the stub flights defining the outer extremities of the seat, threading a continuous multiple flight spiral ribbon in said seat and then welding said ribbon to said stub flight along said chamfered edges.

FRANK C. PICKARD.